(12) United States Patent
Guidry et al.

(10) Patent No.: US 7,526,930 B2
(45) Date of Patent: May 5, 2009

(54) METHOD SYSTEM AND PROGRAM STORAGE DEVICE FOR SYNCHRONIZING DISPLAYS RELATIVE TO A POINT IN TIME

(75) Inventors: Jonathan Guidry, Pearland, TX (US); Mbaga Louis Ahorukomeye, Houston, TX (US); Vincent Bricout, Houston, TX (US); Richard Meehan, Sugar Land, TX (US); Jim Belaskie, Cambridge (GB); Clinton Chapman, Missouri City, TX (US); Joseph Fang, Katy, TX (US); John James, Houston, TX (US); Amr Khairy Mohamed Ahmed Essawi, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 224 days.

(21) Appl. No.: 11/112,278

(22) Filed: Apr. 22, 2005

(65) Prior Publication Data

US 2006/0239118 A1    Oct. 26, 2006

(51) Int. Cl.
*G06F 9/455* (2006.01)

(52) U.S. Cl. ............... 70/10; 702/6; 702/9; 340/853.1; 175/50; 250/269.3

(58) Field of Classification Search .............. 703/10, 703/2, 6; 367/25, 28, 31, 32, 40, 76; 382/36; 702/2, 4, 6, 9; 709/224; 455/67.7; 715/748; 386/125; 340/853.1; 175/50; 250/269.3
See application file for complete search history.

(56) References Cited

U.S. PATENT DOCUMENTS

| | | | | |
|---|---|---|---|---|
| 4,422,165 A | * | 12/1983 | Thomas et al. ............... | 367/40 |
| 4,809,236 A | * | 2/1989 | Hsu et al. ..................... | 367/28 |
| 5,278,805 A | * | 1/1994 | Kimball ....................... | 367/32 |
| 5,361,379 A | * | 11/1994 | White ........................ | 382/227 |
| 5,442,741 A | * | 8/1995 | Hughes et al. .............. | 345/442 |
| 5,544,267 A | * | 8/1996 | Mahoney et al. ............ | 382/317 |
| 5,594,706 A | * | 1/1997 | Shenoy et al. ................ | 367/76 |
| 5,917,482 A | * | 6/1999 | Putnam ..................... | 715/748 |
| 6,152,246 A | | 11/2000 | King et al. | |
| 6,211,873 B1 | * | 4/2001 | Moyer ....................... | 715/764 |
| 6,549,879 B1 | * | 4/2003 | Cullick et al. ................. | 703/10 |
| 6,654,688 B1 | * | 11/2003 | Brie et al. ...................... | 702/2 |
| 6,704,656 B1 | * | 3/2004 | Abriol et al. ................... | 702/6 |

(Continued)

OTHER PUBLICATIONS

Schlumberger, "PerformView—Real-time drilling and visualization software," Dec. 2005.
SPE International—Java Indonesia Section, "SPE News, A Members Magazine," Apr. 2006, pp. 1-24, Jakarta.
Lassoued, Chaden, "Remote support leverages assets," E&P, Mar. 2006, Hart Energy Publishing, Houston, Texas, USA.

*Primary Examiner*—Paul L Rodriguez
*Assistant Examiner*—Kandasamy Thangavelu
(74) *Attorney, Agent, or Firm*—Bryan P. Galloway

(57) ABSTRACT

A method of determining a particular value on a display, comprises the steps of: moving a time log relative to a time line until the time line identifies a selected time on the time log; moving a plurality of values on the display in synchronism with the moving of the time log relative to the time line; and identifying one of the plurality of values on the display when the time line identifies the selected time on the time log, the one of the plurality of values on the display representing the particular value. The particular value on the display comprises a depth on a depth log representing a depth of a drill bit in a borehole. The depth log moves in synchronism with a movement of the time log when the time log moves relative to the time line.

16 Claims, 11 Drawing Sheets

U.S. PATENT DOCUMENTS

| | | | |
|---|---|---|---|
| 6,760,665 B1* | 7/2004 | Francis | 702/6 |
| 2002/0069218 A1* | 6/2002 | Sull et al. | 707/501.1 |
| 2002/0133774 A1* | 9/2002 | Inoue | 714/736 |
| 2003/0126136 A1* | 7/2003 | Omoigui | 707/10 |
| 2003/0210899 A1* | 11/2003 | Fukuchi | 386/125 |
| 2004/0010373 A1* | 1/2004 | Smits et al. | 702/6 |
| 2004/0051650 A1* | 3/2004 | Gonsoulin et al. | 340/853.1 |
| 2004/0064258 A1* | 4/2004 | Ireland | 702/9 |
| 2004/0210392 A1* | 10/2004 | Fleury et al. | 702/6 |
| 2005/0189483 A1* | 9/2005 | Sale | 250/269.3 |
| 2005/0199425 A1* | 9/2005 | Estes et al. | 175/50 |
| 2005/0227625 A1* | 10/2005 | Diener | 455/67.7 |
| 2005/0228590 A1* | 10/2005 | Jeffryes | 702/6 |
| 2005/0234647 A1* | 10/2005 | Haugland | 702/6 |
| 2006/0080432 A1* | 4/2006 | Spataro et al. | 709/224 |
| 2006/0239118 A1 | 10/2006 | Guidry et al. | |

\* cited by examiner

METHOD SYSTEM AND PROGRAM STORAGE DEVICE FOR SYNCHRONIZING DISPLAYS RELATIVE TO A POINT IN TIME

BACKGROUND

The subject matter set forth in this specification relates to a Time Synchronization and Display software adapted for synchronizing different displays which appear on a workstation or other computer system display screen relative to a selected 'period of time', and, in particular, for utilizing a time line on a first display screen to enable the selection the 'period of time' and, responsive thereto, for changing one or more 'other displays' which appear on the computer system display screen such that the 'other displays' will correspond to the selected 'period of time'.

When various time dependent displays appear on a computer system display screen, it is often necessary to manually place a first display into alignment adjacent to a second display in order to visualize a first set of events taking place on the first display at a specific period of time with respect to a second set of events taking place on the second display at the specific period of time.

Therefore, it would be desirable to provide a software system, that is adapted to be stored in a program storage device of a workstation or other computer system, which, when executed by a processor of the computer system, will time-synchronize one or more different displays that appear on the computer system display screen with respect to a particular selected 'period of time'. As a result, since the different displays are automatically time-synchronized with respect to a particular 'period of time' that is selected by a user, it is no longer necessary to manually place the first display into alignment adjacent to the second display in order to visualize the first set of events taking place on the first display at a specific period of time with respect to the second set of events taking place on the second display at the specific period of time.

SUMMARY

One aspect of the present invention involves method of determining a particular value on a display, comprising the steps of: moving a time log relative to a time line until the time line identifies a selected time on the time log; moving a plurality of values on the display in synchronism with the moving of the time log relative to the time line; and identifying one of the plurality of values on the display when the time line identifies the selected time on the time log, the one of the plurality of values on the display representing the particular value.

Another aspect of the present invention involves a program storage device readable by a machine tangibly embodying a program of instructions executable by the machine for performing method steps of determining a particular value on a display, the method steps comprising: moving a time log relative to a time line until the time line identifies a selected time on the time log; moving a plurality of values on the display in synchronism with the moving of the time log relative to the time line; and identifying one of the plurality of values on the display when the time line identifies the selected time on the time log, the one of the plurality of values on the display representing the particular value.

A further aspect of the present invention involves a system adapted for determining a particular value on a display, comprising: apparatus adapted for moving a time log relative to a time line until the time line identifies a selected time on the time log; apparatus adapted for moving a plurality of values on the display in synchronism with the moving of the time log relative to the time line; and apparatus adapted for identifying one of the plurality of values on the display when the time line identifies the selected time on the time log, the one of the plurality of values on the display representing the particular value.

A further aspect of the present invention involves a computer implemented method for determining a value on a positional log relative to an object of interest, comprising the steps of: identifying a selected time; and, during the identifying step, determining the value on the positional log relative to the object of interest in synchronism with the identification of the selected time during the identifying step.

A further aspect of the present invention involves a program storage device readable by a machine tangibly embodying a program of instructions executable by the machine to perform method steps for determining a value on a positional log relative to an object of interest, the method steps comprising: identifying a selected time; and, during the identifying step, determining the value on the positional log relative to the object of interest in synchronism with the identification of the selected time during the identifying step.

A further aspect of the present invention involves a system adapted for determining a value on a positional log relative to an object of interest, comprising: first apparatus adapted for identifying a selected time; and second apparatus adapted for determining the value on the positional log relative to the object of interest in synchronism with the identification of the selected time by the first apparatus.

A further aspect of the present invention involves a computer implemented method adapted for determining values on a display, comprising the steps of: identifying a selected time on a first part of the display; and determining a value on a second part of the display in synchronism with the identification of the selected time on the first part of the display.

A further aspect of the present invention involves a program storage device readable by a machine tangibly embodying a program of instructions executable by the machine to perform method steps for determining values on a display, the method steps comprising: identifying a selected time on a first part of the display; and determining a value on a second part of the display in synchronism with the identification of the selected time on the first part of the display.

Further scope of applicability will become apparent from the detailed description presented hereinafter. It should be understood, however, that the detailed description and the specific examples set forth below are given by way of illustration only, since various changes and modifications within the spirit and scope of the 'Time Synchronization and Display software', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein.

DESCRIPTION

Figure 1:
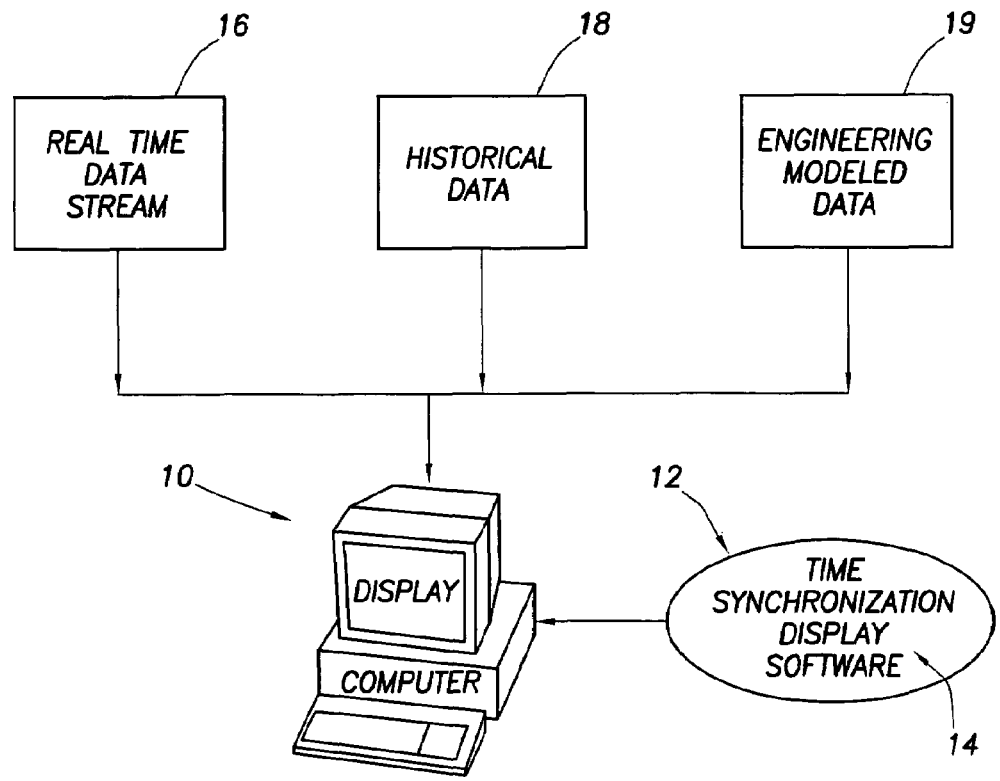
FIG. 1 illustrates a computer system adapted for storing a Time Synchronization and Display software.

This specification discloses a method (and associated system and program storage device) for synchronizing various graphical views of data with a single point in time. When real time measurement data (such as drilling measurement data) are received and displayed on a computer system display screen over a period of time, a multitude of such measurement data are being updated and displayed on the computer system display screen in real time. The measurement data may be viewed in different ways. For example, the measurement data can be viewed in the form of a crossplot, or a pie chart, or a bar chart. Alternatively, the measurement data can be viewed, on the computer system display screen, in the form of 'time based data' or 'depth based data'. This specification discloses a method (and associated system and program storage device) adapted for synchronizing all the received 'real-time measurement data' (and/or 'historical data') with respect to 'one given selected point in time'. For example, at 'one given selected point in time', all the displays appearing on the computer system display screen are illustrating or displaying the same exact piece of measurement data and/or the same exact range of measurement data which was received at the 'one given selected point in time'. In particular, when a user selects 'one given point in time' on a time log, a depth log is synchronized with, or correlated with, the time log at that 'one given point in time'. In addition, the crossplots and pie charts and bar charts are also synchronized with the time log at that 'one given point in time'.

During drilling over a period of time, a drill bit is being moved up and down in a borehole during that period of time. When the above referenced measurements (such as lithology or gamma ray or resistivity or shocks and vibrations) are based on depth, a shorter 'depth log' (e.g., 10,000 feet) may be generated corresponding to a longer 'time log' (e.g., three days worth of time log data). When tripping into and out of the borehole, the Bottom Hole Assembly (BHA) of a borehole tool could be passing the same borehole depth a multiple number of times during the tripping into and out of the borehole. If a problem exists at a 'specific depth' at a 'given point in time', it is usually necessary to perform a 'manual process' in order to determine the 'specific depth' of interest (where the problem occurred) and the corresponding 'range of data' of interest which corresponds to that 'specific depth' of interest at that 'given point in time'.

In order to avoid this 'manual process', this specification discloses a 'Time Synchronization and Display software' that will allow a user to move a 'time log' relative to a 'time line'; and, when the user moves the 'time log' relative to the 'time line', a 'positional log' (for example, a 'depth log') is also moving relative to 'one fixed point on an object of interest' [e.g., relative to the 'drill bit on a Bottom Hole Assembly (BHA) of a borehole tool'] in 'synchronization' with the movement of the 'time log' relative to the 'time line'. As a result, the user can determine the exact 'position' (e.g., the depth) in the borehole where the 'one fixed point on the object of interest' (e.g., the drill bit on the BHA of the borehole tool) was located at any previous or current point in time. In particular, the user can select a 'specific time' by moving a 'time log' relative to a 'time line' and, responsive to that selection of the 'specific time', the user can then easily determine a position (e.g., a depth) on a 'positional log' (e.g., a 'depth log') where the 'one fixed point on the object of interest' (e.g., the drill bit on the BHA of the borehole tool) was located in the borehole at that 'specific time' because the 'positional log' (e.g., the 'depth log') is moving relative to the 'object of interest' [e.g., the Bottom Hole Assembly (BHA) of the borehole tool] in 'synchronization' with the movement of the 'time log' relative to the 'time line'. That is, the position on the 'positional log' (e.g., the depth on the 'depth log') can be easily determined because, as the user is scrolling the 'time log' relative to the 'time line', the 'positional log' (e.g., the 'depth log') is also scrolling relative to the 'one fixed point on the object of interest' (e.g., relative to the drill bit on the BHA) in synchronization with the scrolling of the 'time log' relative to the 'time line'. In addition, when the 'time log' is scrolling relative to the 'time line', the other displays, including the crossplots and the pie charts and the bar charts, will also be changed in synchronization with the scrolling of the 'time log' relative to the 'time line'.

Consequently, as a result of the Time Synchronization and Display software disclosed in this specification, as a user scrolls through time on a 'time log' (by adjusting the position of a time line relative to the time log), a corresponding 'positional log' (e.g., a 'depth log') will always be scrolling adjacent to the 'object of interest' (e.g., adjacent to the BHA of the borehole tool); and the 'positional log' (e.g., the 'depth log') will be scrolled in synchronism with the scrolling of the 'time log'; and, in addition, the crossplots and the pie charts and the bar charts will also be adjusted in synchronization with the 'time log'. The user will always be able to determine the position (e.g., the depth) on a 'positional log' (e.g., on a 'depth log') of the 'object of interest' (e.g., the Bottom Hole Assembly or BHA) in a borehole because the scrolling of the 'positional log' (e.g., the 'depth log') is accomplished in synchronization with the scrolling of a 'time log' relative to a 'time line'.

The Time Synchronization and Display software disclosed in this specification will therefore perform the following functions when executed by the processor of a computer system: (1) Ability to display Bit position versus Hole Depth relative to a "Time Line"; (2) The BHA's bit will follow the "Time Line" bit depth when the time line is moved; (3) The BHA is drawn to scale along the depth log showing how its components relate to the depth data, and this includes the actual position and sizes of stabilizers and the actual position of sensors in Measurement While Drilling (MWD)/Logging While Drilling (LWD) tools; (4) Ability to focus an analysis on a specific time point or period without manually rescaling or resizing each plot; (5) Compute a time breakdown of rig states using a pie or bar chart in conjunction with rig states; (6) Plot time data with respect to an axis other than time while synchronized with the "Time Line"; (7) Plot Depth data with respect to an axis other than depth while synchronized with the Hole Depth at the "Time Line"; (8) Focus all plots and logs to the time period and/or depth range associated with a drilling event; (9) Automatically update engineering models with data acquired in real-time and compare it to the modeled data; and (10) Provide a unique environment for Users to analyze data by controlling each plot's data range with a single "Time Line". The engineering models are updated in real-time with some measurement data received in real-time. The newly updated models are then compared to other real-time measurement data; for example, update the 'tripping loads model' with user-defined 'friction factors', then plot actual hookload values against the model in real-time.

Referring to FIG. 1, a typical computer system is illustrated. In FIG. 1, a computer system 10 receives a program storage device 12 (such as a CD-ROM) on which is stored a software hereinafter known as a 'Time Synchronization and Display software' 14. The program storage device 12 is inserted into the computer system 10 and the 'Time Synchronization and Display software' 14 is stored into the memory of the computer system 10. Then, the computer system 10 receives the following types of input data: (1) a 'real time data stream' 16, (2) 'historical data' 18, and (3) 'engineering modeled data' 19. The 'real time data stream' 16 may contain data that may be displayed in 'logs' on a display screen. In addition, the 'real time data stream' 16 may, itself, become 'historical data' 18. The term 'log' refers to an output signal which is recorded on a sheet or chart with respect to an (x, y) axis, where the x-axis is usually 'depth in a borehole' and the y-axis is usually a measured parameter, such as resistivity or permeability. The computer system 10 is adapted for executing the 'Time Synchronization and Display software' 14 while using the 'real time data stream' 16 and the 'historical data' 18 and the 'engineering modeled data' 19, and, responsive thereto, the computer system 10 will record on a 'display' (or otherwise printout or record or display on some other 'recorder or display device') an 'output' which is comprised of 'one or more time or depth data displays'.

Figure 2:
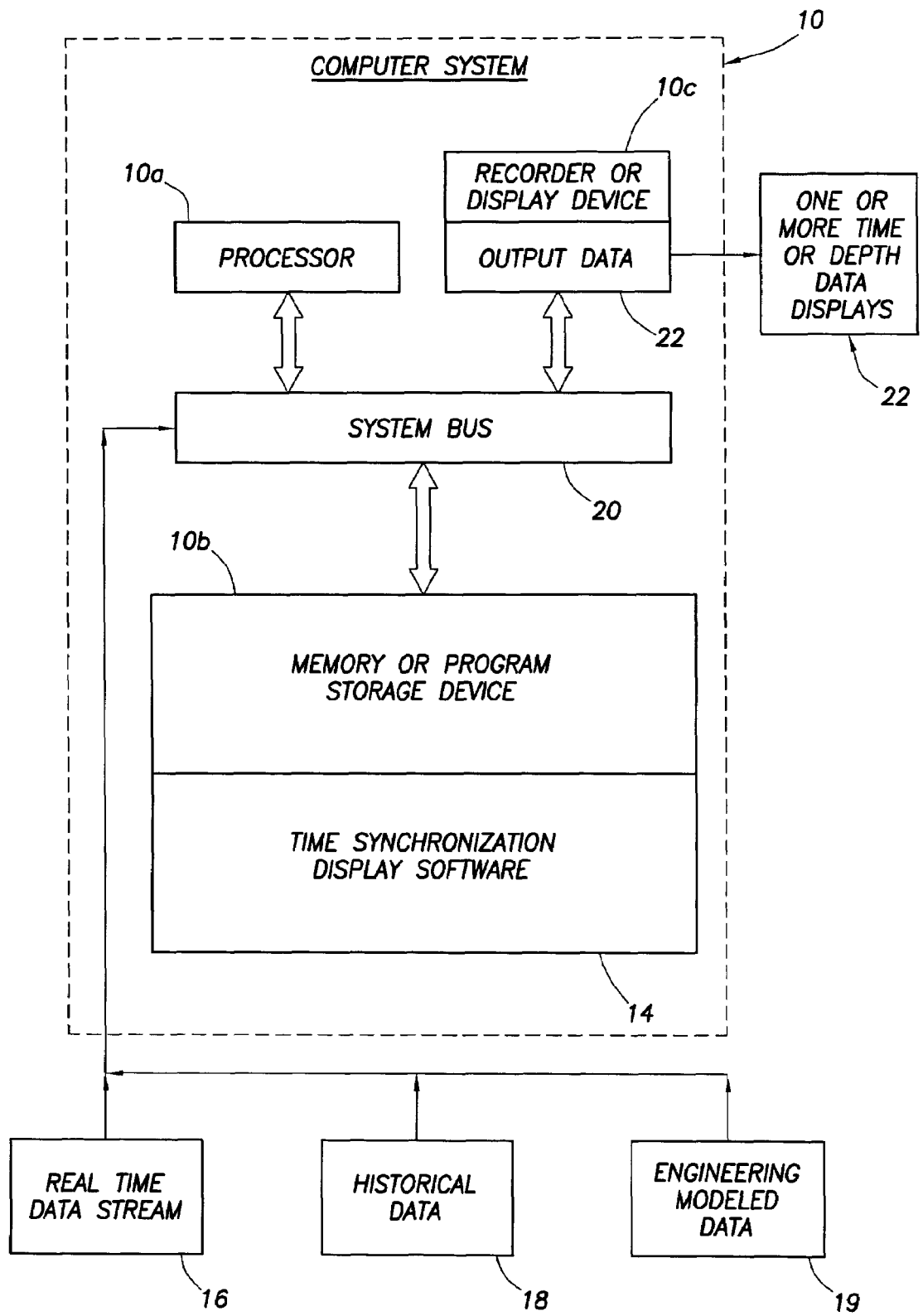
FIG. 2 illustrates a more detailed construction of the computer system of FIG. 1 which stores the Time Synchronization and Display software, the computer system generating 'one or more time or depth data displays' when the Time Synchronization and Display software is executed.

Referring to FIG. 2, a more detailed construction of the computer system 10 of FIG. 1 is illustrated. In FIG. 2, the computer system 10 includes a processor 10a operatively connected to a system bus 20, a memory or other program storage device 10b operatively connected to the system bus 20, and a recorder or display device 10c operatively connected to the system bus 20. The memory or other program storage device 10b stores the Time Synchronization and Display software 14 which was previously loaded into the memory 10b from the program storage device 12 of FIG. 1. The Time Synchronization and Display software 14 is owned and operated by Schlumberger Technology Corporation of Houston, Tex. The computer system 10 receives 'Input Data' 16 and 18, where the 'Input Data' 16 and 18 includes: (1) the 'real time data stream' 16, (2) the 'historical data' 18, and (3) the 'engineering modeled data' 19. The processor 10a will execute the Time Synchronization and Display software 14, while simultaneously using the 'real time data stream' 16 and the 'historical data' 18 and the 'engineering modeled data' 19; and, responsive thereto, the recorder or display device 10c will generate 'Output Data' 22 which is adapted to be recorded by or displayed on the recorder or display device 10c. The 'Output Data' 22 includes 'one or more time or depth data displays' 22. The computer system 10 may be a personal computer (PC), a workstation, or a mainframe. Examples of possible workstations include a Silicon Graphics Indigo 2 workstation or a Sun SPARC workstation or a Sun ULTRA workstation or a Sun BLADE workstation. The 'application' disclosed in this specification is a 'windows-based application' running on any IBM compatible PC. The memory or program storage device 10b is a computer readable medium or a program storage device which is readable by a machine, such as the processor 10a. The processor 10a may be, for example, a microprocessor, a microcontroller, or a mainframe or workstation processor. The memory or program storage device 10b, which stores the Time Synchronization and Display software 14, may be, for example, a hard disk, ROM, CD-ROM, DRAM, or other RAM, flash memory, magnetic storage, optical storage, registers, or other volatile and/or non-volatile memory.

Figure 3:
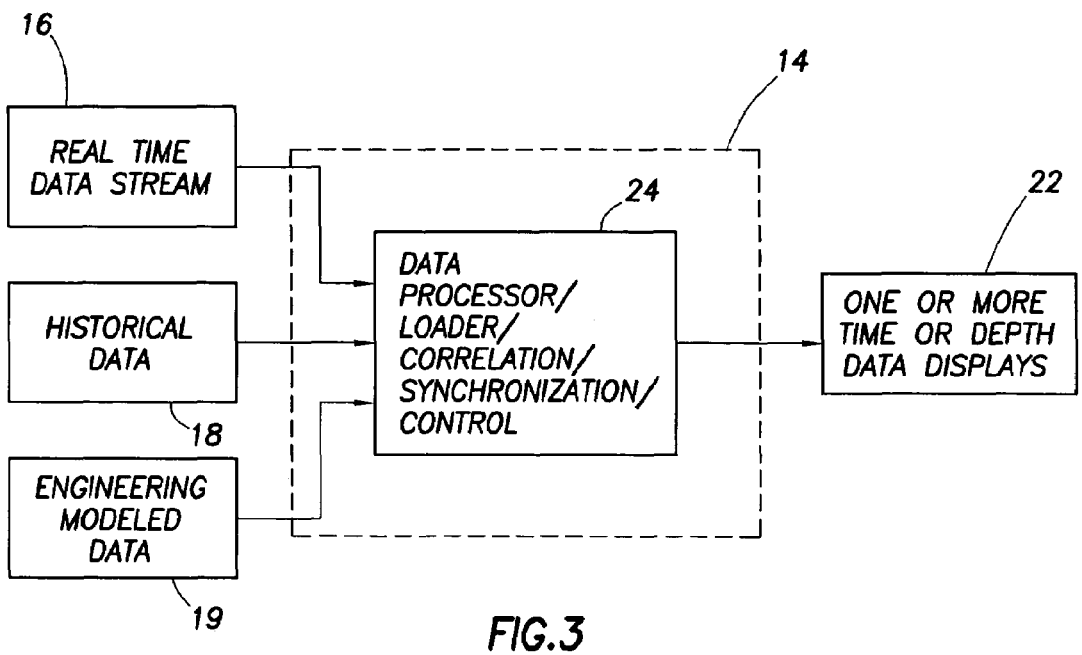
FIG. 3 illustrates the Time Synchronization and Display software of FIG. 2 which includes a 'Data Processor, Loader, Correlation, and Synchronization Control'.
Figure 4:
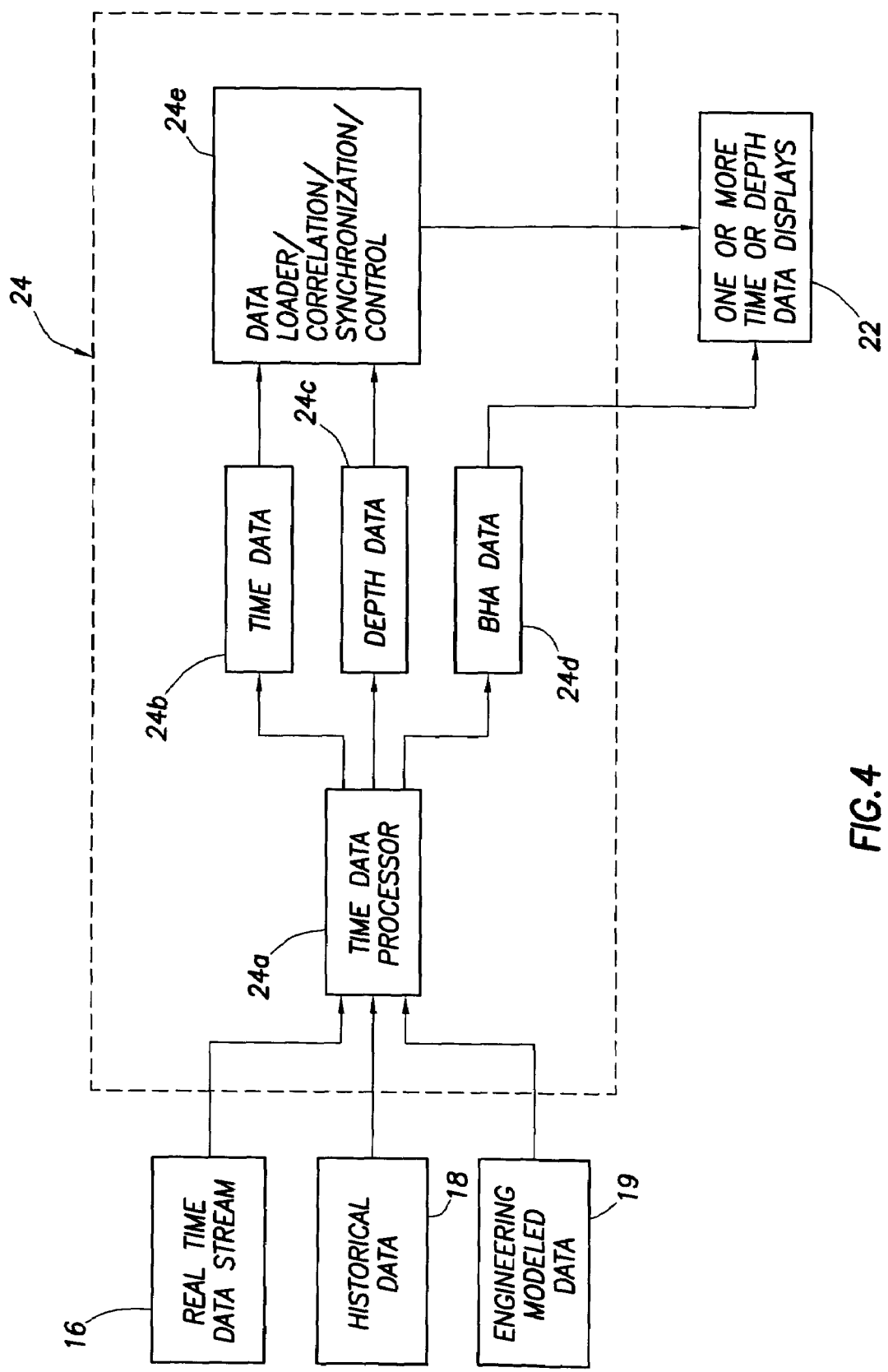
FIG. 4 illustrates a detailed construction of the 'Data Processor, Loader, Correlation, and Synchronization control' of FIG. 3 which forms a part of the Time Synchronization and Display software of FIG. 2.
Figure 5:
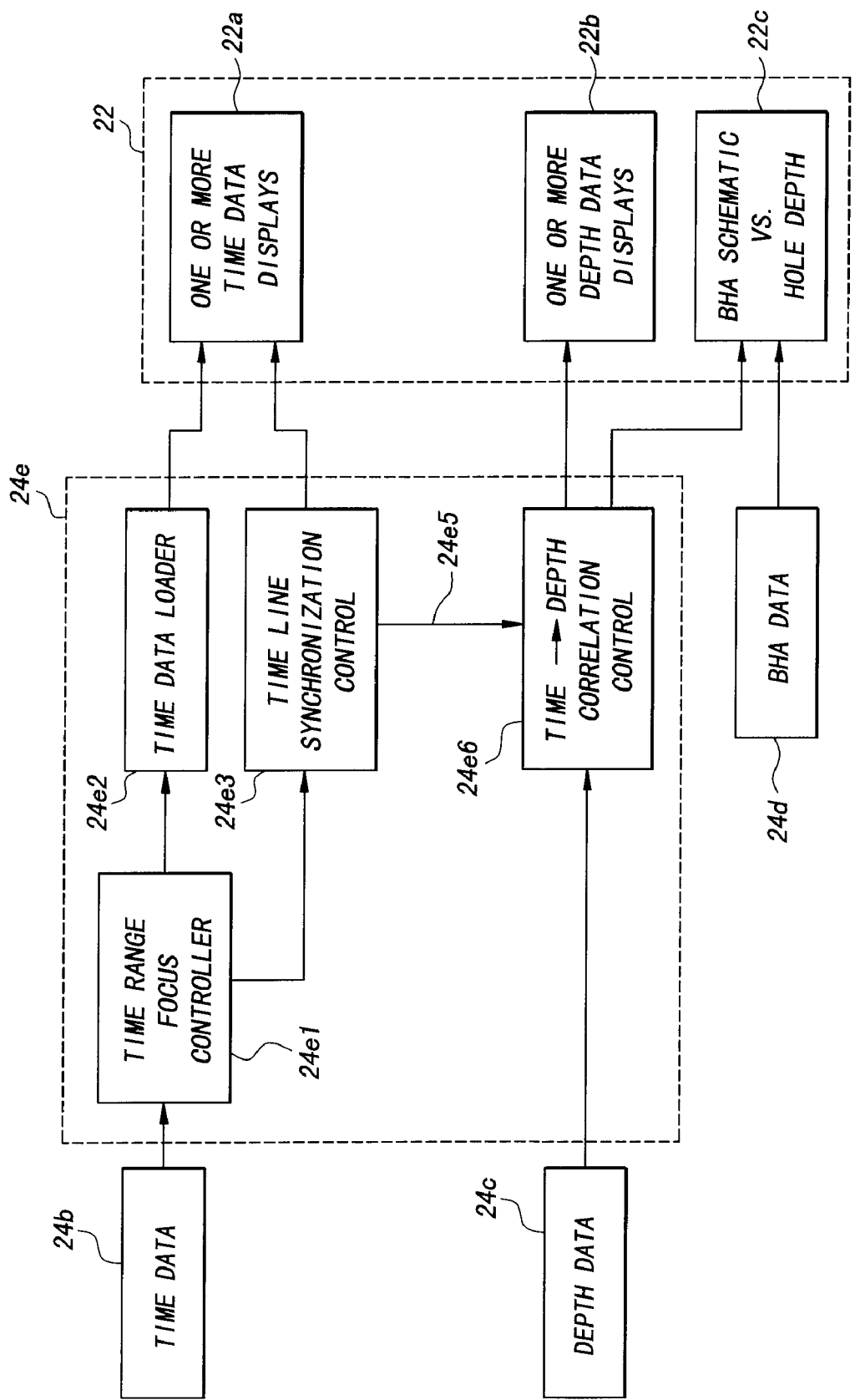
FIG. 5 illustrates a detailed construction of the 'Data Loader, Correlation, and Synchronization Control' of FIG. 4 associated with the 'Data Processor, Loader, Correlation, and Synchronization control' of FIG. 3 associated with the Time Synchronization and Display software of FIG. 2.

Referring to FIGS. 3, 4, and 5, a detailed construction of the Time Synchronization and Display Software 14 of FIGS. 1 and 2 is illustrated.

In FIG. 3, the Time Synchronization and Display Software 14 includes a 'Data Processor, Loader, Correlation, and Synchronization control' 24 (hereinafter, the 'Data Processor' 24). The 'Data Processor' 24 will receive a 'real time data stream' 16 and 'historical data' 18 and 'engineering modeled data' 19, and, responsive thereto, the 'Data Processor, Loader, Correlation, and Synchronization control' 24 will generate the 'one or more time or depth data displays' 22. The 'Data Processor' 24 can receive the 'real time data stream' 16 and, responsive thereto, generate 'one or more time or depth data displays' 22 which will display the 'real time data stream'; or the 'Data Processor' 24 can receive the 'historical data' 18 and the 'engineering modeled data', and, responsive thereto, generate the 'one or more time or depth data displays' 22 which will display the 'historical data' and the 'engineering modeled data'.

In FIG. 4, a detailed construction of the 'Data Processor, Loader, Correlation, and Synchronization control' 24 of FIG. 3 includes: (1) a 'Time Data Processor' 24a, which will receive the 'real time data stream' 16 and the 'historical data' 18 and the 'engineering modeled data' 19, and, responsive thereto, the 'Time Data Processor 24a will generate 'time data' 24b, 'depth data' 24c, and 'BHA data' 24d; and (2) a 'Data Loader, Correlation, Synchronization control 24e which will receive the 'time data' 24b and the 'depth data' 24c. The 'depth data' 24c includes: a 'plurality of depth data values', and a 'plurality of time data values' which correspond, respectively, to the 'plurality of depth data values'; as a result, there exists a time value for each depth data value. The 'Data Loader, Correlation, Synchronization control' 24e will receive the 'time data' 24b and the 'depth data' 24c from the 'Time Data Processor' 24a, and, responsive thereto, the 'Data Loader, Correlation, Synchronization control' 24e will then load 'a portion of a particular depth data range' of the 'depth data' associated with a 'bit depth' into each individual graphical object depending on a 'selected time' on a 'time log' relative to a 'time line' that is selected by a user. Although the 'depth based data' is synchronized with the 'time based data' via the time based 'bit depth' data, they can be synchronized using any time based depth measurement (e.g., hole depth or formation depth, etc).

In particular, in response to the time data 24b and the depth data 24c, the 'Data Loader, Correlation, Synchronization control' 24e will determine the 'portion of the particular depth data range' that is associated with a 'bit depth' at a 'particular point in time' of the 'time data' 24b and then the 'Data Loader, Correlation, Synchronization control' 24e will send that 'portion of the particular depth data range' to each graphical object which includes the 'one or more time or depth data displays' 22 (recall that a 'graphical object' is a crossplot or a pie chart or a bar chart or a 'time log' or a 'depth log').

The 'data loader' portion of the 'Data Loader, Correlation, Synchronization control' 24e will receive the 'time data' and the 'depth data', and, responsive thereto, the 'data loader' will send a 'portion of the particular depth data range' associated with each 'bit depth' of each 'particular point in time' of the 'time data' to the 'synchronization control'.

However, in response to the output from the 'data loader', the 'synchronization control' portion of the 'Data Loader, Correlation, Synchronization Control' 24e will send only that 'portion of the particular depth data range' associated with a single 'bit depth' corresponding to a 'selected point in time' to each graphical object (for loading therein) depending upon the 'selected point in time' that was selected by the user. Recall that the 'selected point in time' is selected by a user by adjusting a 'time log' relative to a 'time line' until the 'time line' is displayed directly over the 'selected point in time' on the 'time log' (this function will be discussed in more detail later in this specification). For example, in response to the 'selected point in time', the 'synchronization control' tells each graphical object: "you are looking at only that 'portion of the particular depth data range' which ranges from a first depth to a second depth, the 'portion of the particular depth data range' corresponding to the 'bit depth' at the 'selected point in time'". The BHA data 24d (which represents the 'BHA' of a borehole tool being displayed on the 'one or more time or depth data displays') will be sent directly to the 'one or more time or depth data displays' 22. In FIG. 4, the 'one or more time or depth data displays' 22 represent multiple 'graphical objects' or graphical views of the time and depth data. For example, the 'one or more time or depth data displays' 22 can be a crossplot, a pie chart, a bar chart, a 'depth log' adjacent to the BHA of a borehole tool (originating from the BHA data 24d), and a 'time log' adjacent to a 'time line'.

In FIG. 5, a detailed construction of the 'Data Loader, Correlation, and Synchronization Control' 24e of FIG. 4 is illustrated. In FIG. 5, the 'Data Loader, Correlation, and Synchronization Control' 24e includes: (1) a 'Time Range Focus Controller' 24e1 which receives the Time Data 24b, (2) a 'Time Data Loader' 24e2 which receives an output from the 'Time Range Focus Controller' 24e1, (3) a 'Time Line Synchronization Control' 24e3 which receives an output from the 'Time Range Focus Controller 24e1', and (4) a 'Time→Depth Correlation Control' 24e6 which receives the 'depth data' 24c and an output on line 24e5 from the 'Time Line Synchronization Control' 24e3. Recall that the 'depth data' 24c includes: a plurality of depth data values, and a plurality of time data values which correspond, respectively, to the plurality of depth data values; as a result, there exists a time value for each depth data value. In FIG. 5, the 'one or more time or depth data displays' 22 of FIG. 4 includes: (1) 'one or more time data displays' 22a which receives an output from the 'Time Data Loader' 24e2 and the 'Time Line Synchronization Control' 24e3, (2) 'one or more depth data displays' 22b which receives an output from the 'Time→Depth Correlation Control' 24e6, and (3) a BHA Schematic vs. Hole Depth 22c which receives an output from the 'Time→Depth Correlation Control' 24e6 and the BHA Data 24d. In operation, still referring to FIG. 5, the 'Time Range Focus Controller' 24e1 receives the time data 24b and, responsive thereto, sends 'time range data' to the 'Time Data Loader' 24e2 which will then send the 'time range data' to the 'one or more time data displays' 22a. The 'time range data' is comprised of a range of times extending from a 'start time' to an 'end time'. However, the 'Time line Synchronization Control' 24e3 will receive the 'time range data' from the 'Time Range Focus Controller' 24e1 and, responsive thereto, the 'Time Line Synchronization Control' 24e3 will determine a 'current time in the data', where the 'current time in the data' will be a specific time which lies within the 'time range data'. The 'Time Line Synchronization Control' 24e3 will then send the 'current time in the data' to the 'one or more time data displays' 22a of FIG. 5. At this point, the 'one or more time data displays' 22a will be receiving: (1) the 'time range data' (comprised of a range of times from the 'start time' to the 'end time') from the 'Time Data Loader' 24e2, and (2) the 'current time in the data' from the 'Time Line Synchronization Control' 24e3. In the meantime, the 'Time Line Synchronization Control' 24e3 will be sending the 'current time in the data' along a line 24e5 to the 'Time→Depth Correlation Control' 24e6. Recall that the 'Time→Depth Correlation Control' 24e6 is receiving the 'depth data' 24c. Therefore, the 'Time→Depth Correlation Control' 24e6 will be receiving both the 'current time in the data' (from line 24e5) and the 'depth data' 24c. Recall that the 'depth data' 24c includes: a 'plurality of depth data values', and a 'plurality of time data values' which correspond, respectively, to the 'plurality of depth data values'; as a result, there exists a time data value for each depth data value. At this point, the 'Time→Depth Correlation Control' 24e6 will perform the following function: the 'Time→Depth Correlation Control' 24e6 will receive the 'current time in the data' from line 24e5; the 'Time→Depth Correlation Control' 24e6 will then locate, from among the 'plurality of time data values' of the 'depth data' 24c, a 'particular time data value' which corresponds directly to the received 'current time in the data', and then the 'Time→Depth Correlation Control' 24e6 will generate a 'particular depth data value', from among the 'plurality of depth data values' of the 'depth data' 24c, which corresponds directly to the 'particular time data value'. The 'Time→Depth Correlation Control' 24e6 stores in two columns the following information: a 'plurality of particular depth data' is stored in a first column, and a 'corresponding plurality of ranges of depth data from zero to the particular depth data' is stored in a second column which correspond, respectively, to the 'plurality of particular depth data' in the first column. Therefore, when the 'particular depth data value' is determined by the 'Time→Depth Correlation Control' 24e6 as noted above, the 'Time→Depth Correlation Control' 24e6 will then attempt to locate a match between the incoming 'particular depth data value' and 'one of the plurality of particular depth data' stored in the first column, and, when a match is found, the 'Time→Depth Correlation Control' 24e6 will then locate 'one of the ranges of depth data from zero depth to the particular depth data value' in the second column which corresponds to the 'one of the plurality of particular depth data value' in the first column. The 'Time→Depth Correlation Control' 24e6 will then send the aforesaid 'one of the ranges of depth data from zero depth to the particular depth data value' to both the 'one or more depth data displays' 22b and the 'BHA Schematic vs. Hole Depth' display 22c. In summary, therefore, the 'Time→Depth Correlation Control' 24e6 will: (1) receive the 'current time in the data' from line 24e5; (2) locate, from among the 'plurality of time data values' of the 'depth data' 24c, a 'particular time data value' which corresponds directly to the received 'current time in the data'; (3) generate a 'particular depth data value', from among the 'plurality of depth data values' of the 'depth data' 24c, which corresponds directly to the 'particular time data value'; (4) determine a 'range of depth data from zero depth to the particular depth data value' which corresponds directly to the 'particular depth data value'; and (5) send the 'range of depth data from zero depth to the particular depth data value' to the 'one or more depth data displays' 22b and to the 'BHA Schematic vs. Hole Depth' display 22c. At this point, note that: (1) the 'one or more time data displays' 22a will be receiving the 'time range data' (comprised of a range of times from the 'start time' to the 'end time') from the 'Time Data Loader' 24e2, and the 'current time in the data' from the 'Time Line Synchronization Control' 24e3; (2) the 'one or more depth data displays' 22b will be receiving the 'range of depth data from zero depth to the particular depth data value' from the 'Time→Depth Correlation Control' 24e6; and (3) the 'BHA Schematic vs. Hole Depth' display 22c will be receiving both: the 'range of depth data from zero depth to the particular depth data value' from the 'Time→Depth Correlation Control' 24e6, and the BHA data 24d.

Figure 6:
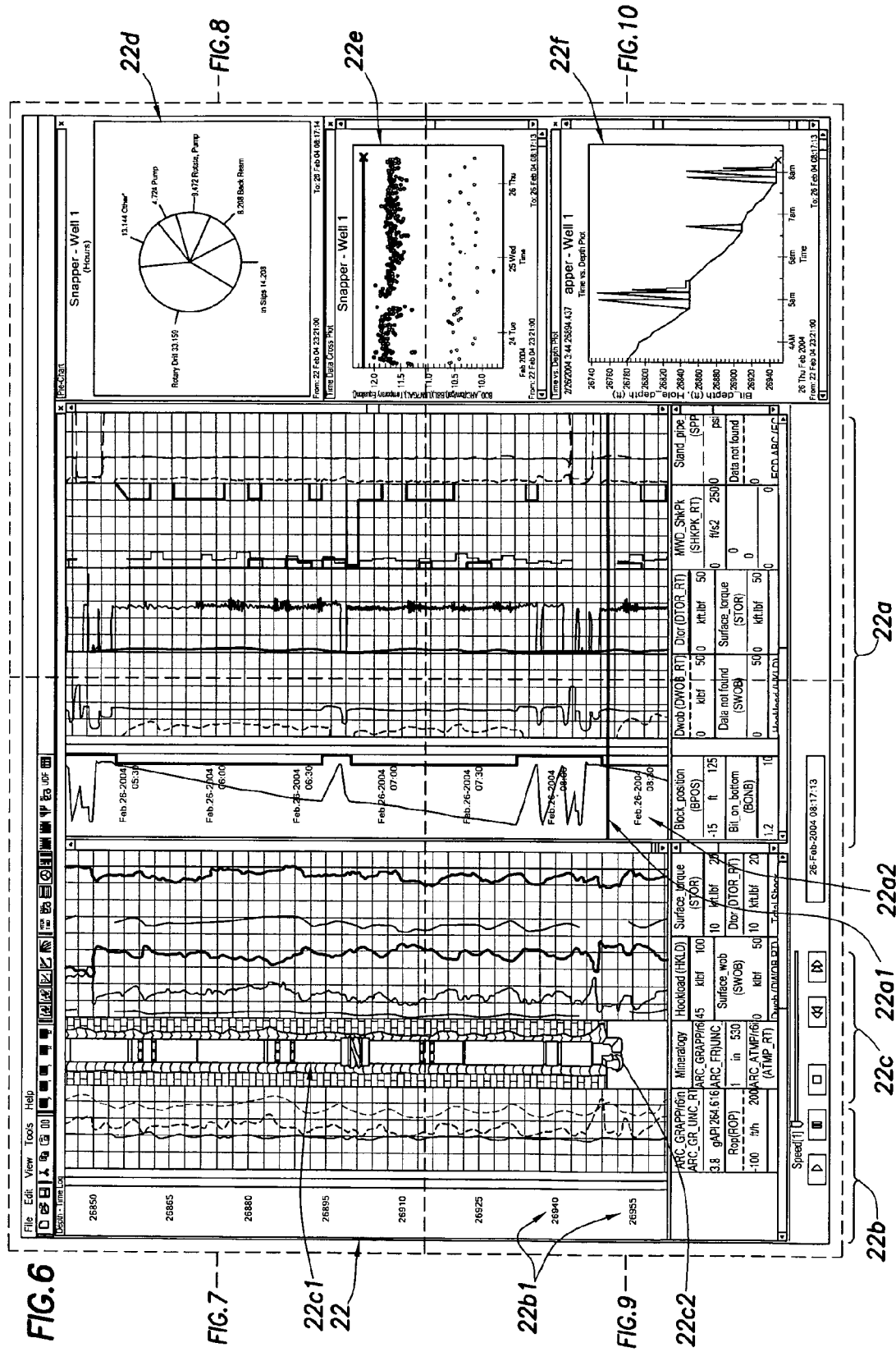
FIGS. 6, 7, 8, 9, and 10 illustrate an example of one of the 'one or more time or depth data displays' of FIG. 2 which is generated by the computer system of FIGS. 1 and 2 when the Time Synchronization and Display software of FIG. 2 is executed by the computer system processor of FIG. 2, FIG. 9 illustrating another feature associated with the 'one or more time or depth data displays' of FIG. 6 including a 'play' feature, a 'pause' feature, a 'stop' feature, a 'fast reverse' feature, a 'fast forward' feature, and a speed controller feature (located above the play and stop buttons) allowing a user to choose a playback speed when a plan feature is activated thereby allowing the user to play data at a multitude of speeds, such as two-times, three-times, . . . , ten-times, etc.
Figure 10:
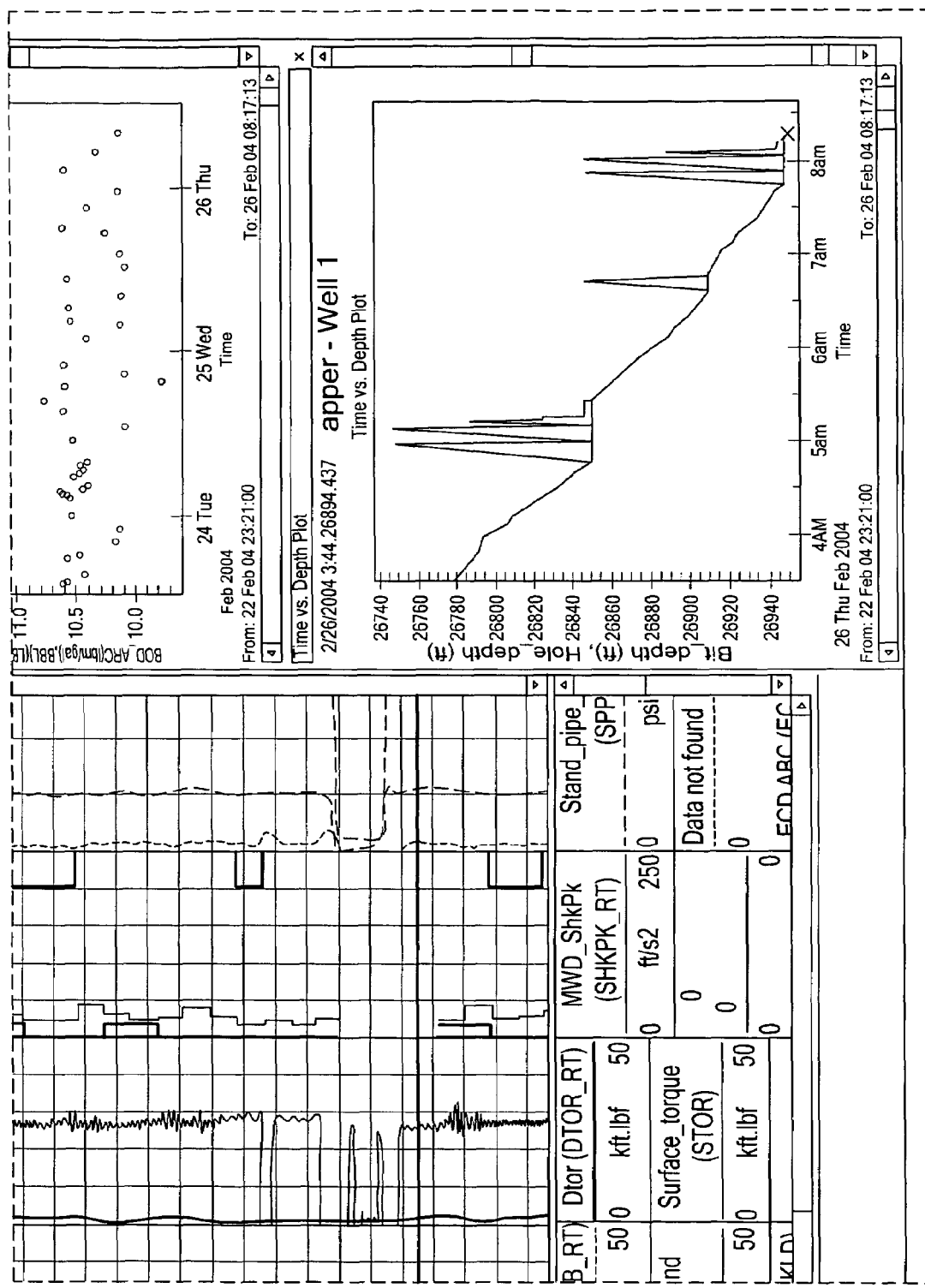
Figure 11:
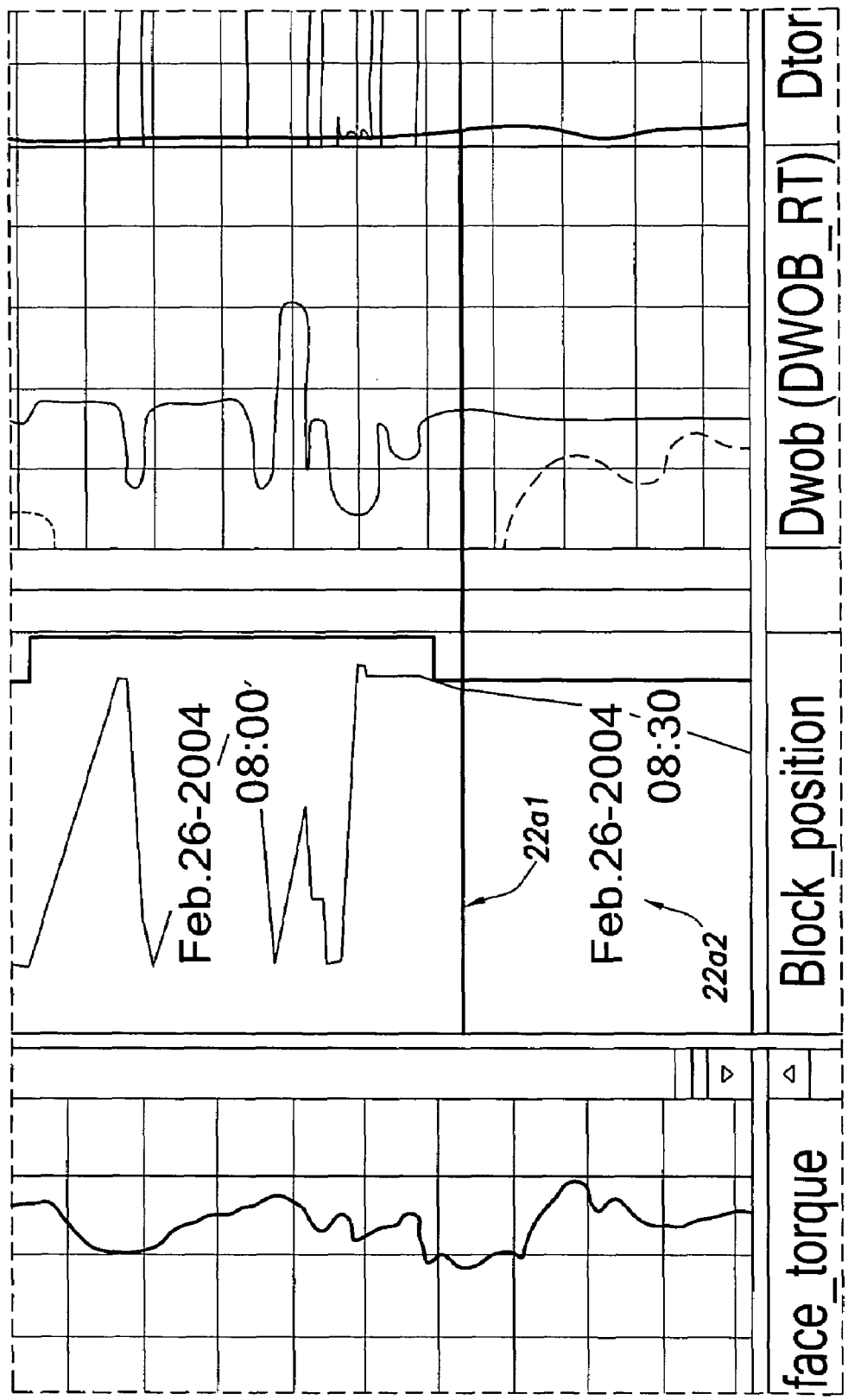
FIG. 11 illustrates a time line which is visible on the lower right portion of the display of FIG. 6, the time line being usable and selectable by a user to select a particular period of time.
Figure 12:
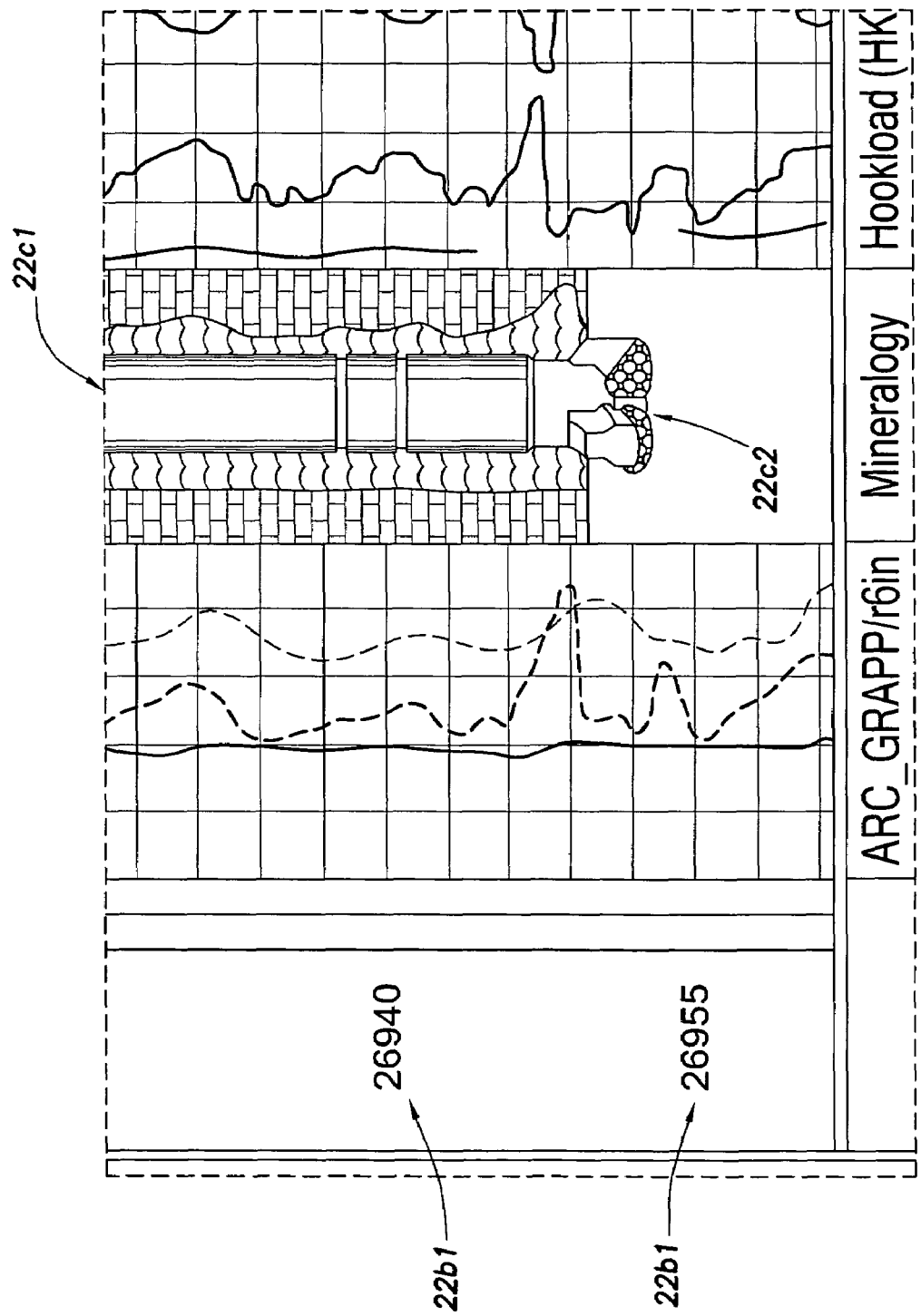
FIG. 12 illustrates a depth data display, located adjacent a drill bit associated with a scaled image of a Bottom Hole Assembly (BHA), having display characteristics that are changed to correspond to a particular period of time when a user uses the time line of FIG. 11 to select the particular period of time.

Referring to FIG. 6 (which includes FIGS. 7, 8, 9, and 10), FIG. 11 and FIG. 12, one example of the 'one or more time or depth data displays' 22 of FIGS. 2 through 5 is illustrated. In FIG. 6, a scaled image of an 'object of interest', namely, a scaled image of a Bottom Hole Assembly (BHA) is illustrated. Note that, in FIG. 6, the depth logs 22b1 and the BHA 22c1 and 22c2 are displayed on the same length scale.

Figure 7:
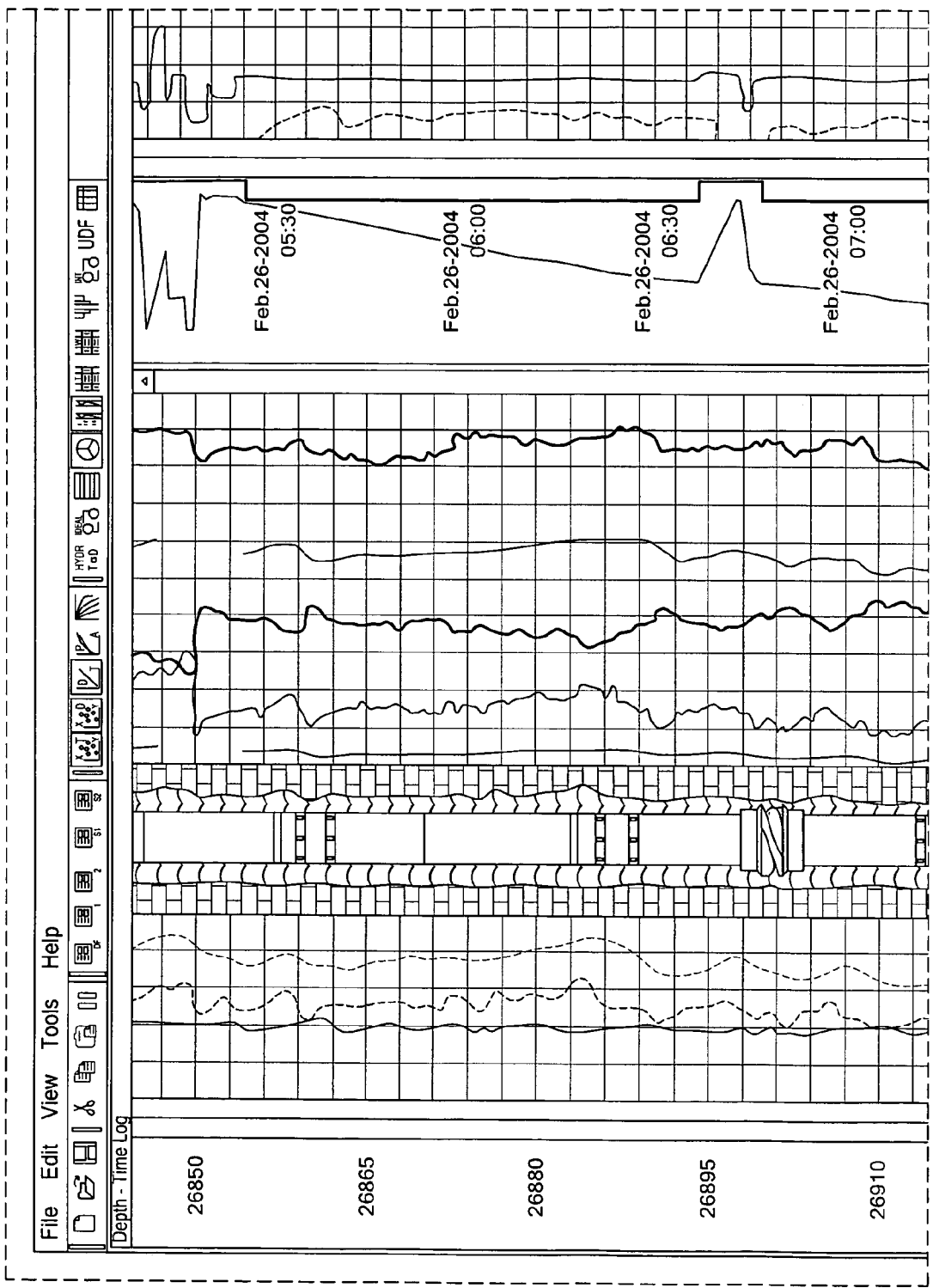
Figure 8:
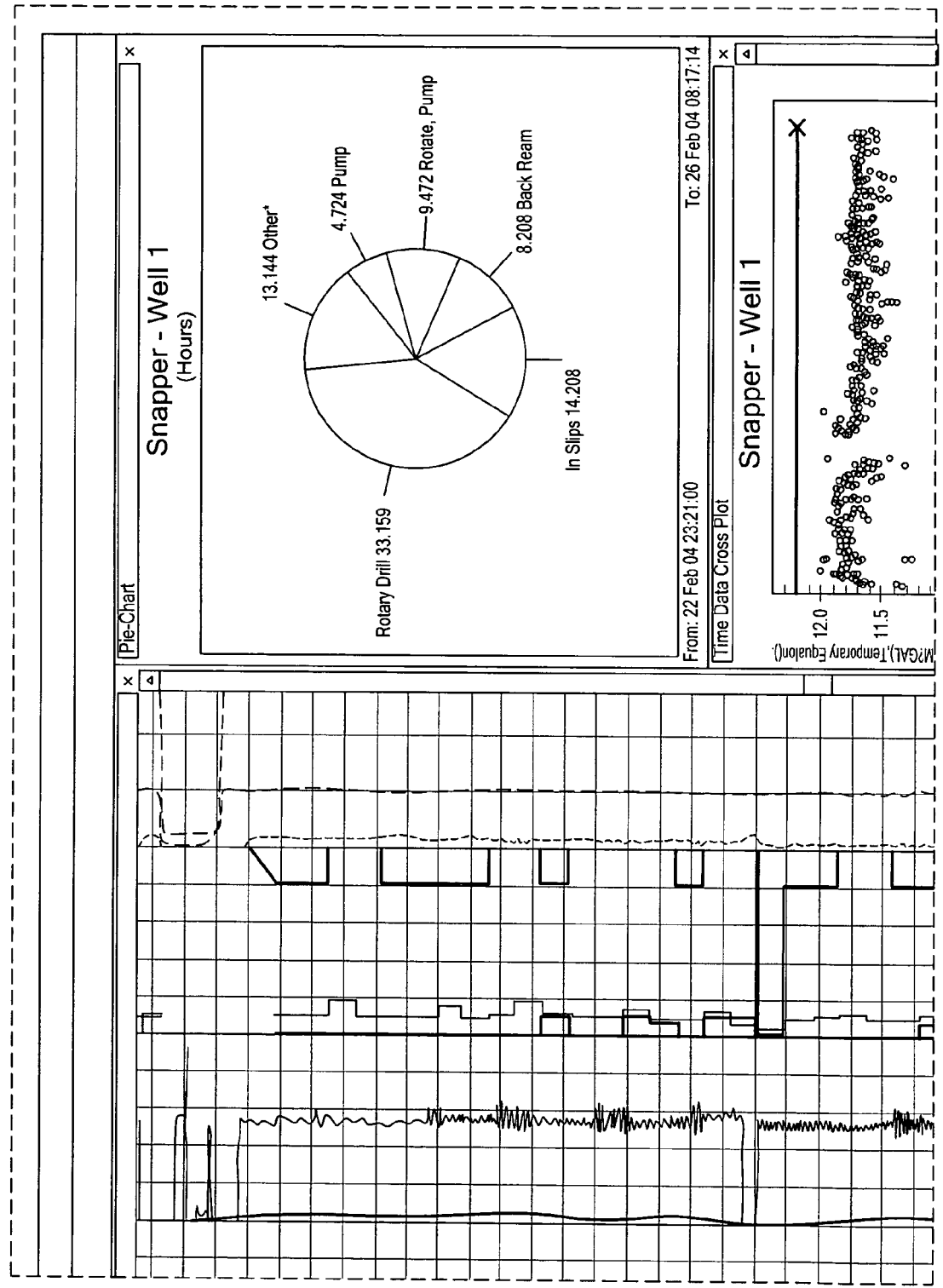
Figure 9:
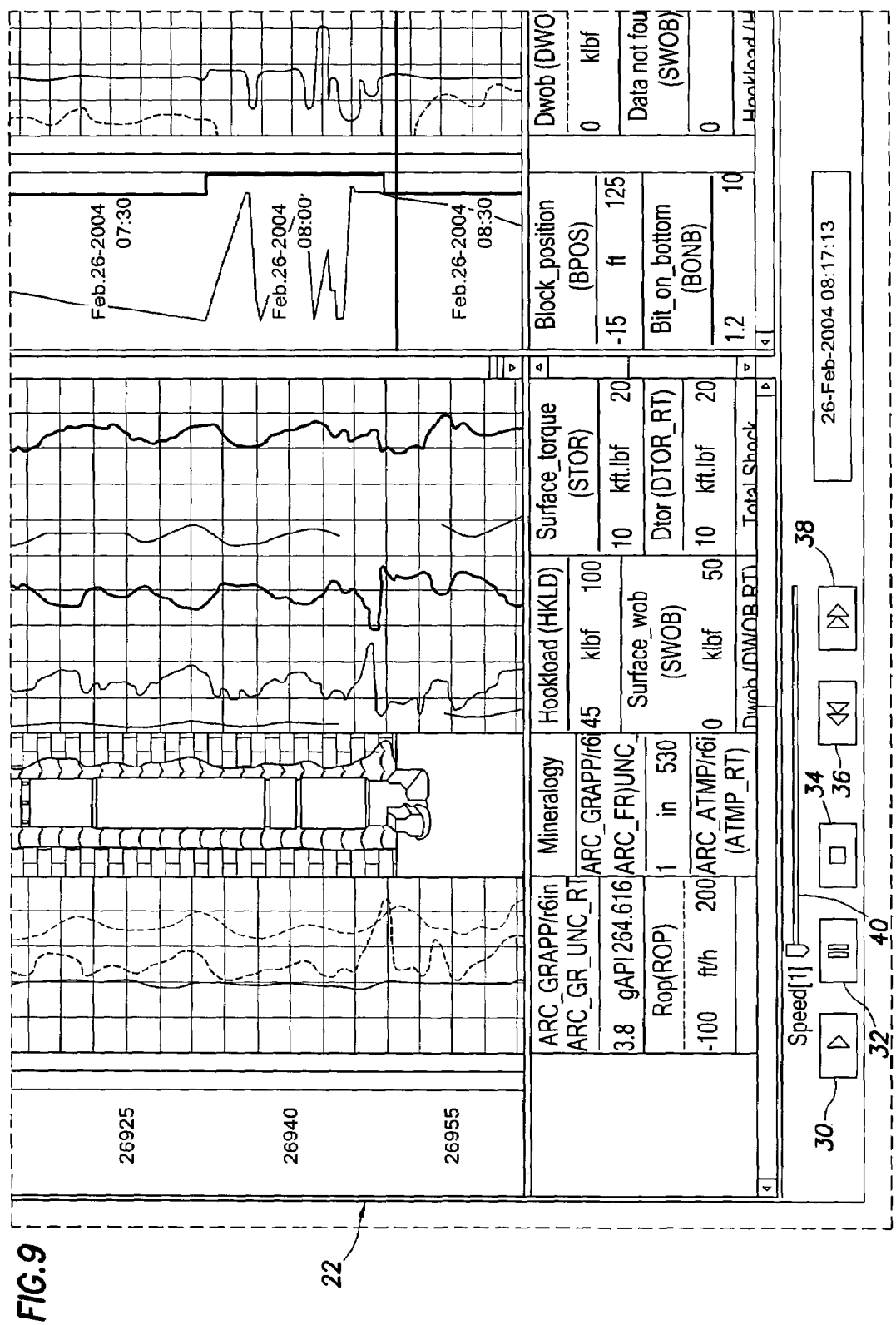

FIG. 6 includes: (1) FIG. 7 representing the upper left hand corner of FIG. 6, (2) FIG. 8 representing the upper right hand corner of FIG. 6, (3) FIG. 9 representing the lower left hand corner of FIG. 6, and (4) FIG. 10 representing the lower right hand corner of FIG. 6. FIG. 11 illustrates, in greater detail, the time line 22a1 relative to the time log 22a2. FIG. 12 illustrates, in greater detail, the depth log 22b1 relative to the drill bit 22c2 of the Bottom Hole Assembly (BHA) 22c1.

In FIG. 6, the 'one or more time or depth data displays' 22 includes the 'one or more time data displays' 22a, the 'one or more depth data displays' 22b, and the 'BHA Schematic vs hole depth' 22c. The 'one or more time data displays' 22a includes a 'time line' 22a1 which is displayed over and adjacent to a 'time log' 22a2. The 'time log' 22a2 can be adjusted, by a user, relative to the 'time line' 22a1; this adjustment will locate a 'current time in the data' (see line 24e5 of FIG. 5 which sends the 'current time in the data' from control 24e3 to control 24e6). In operation, if the user wants to know the depth of the Bottom Hole Assembly (BHA) in the borehole at a 'time t1', for example, the user must adjust the 'time log' 22a2 relative to the 'time line' 22a1 in FIG. 6 until the 'time line' 22a1 points to the 'time t1' on the 'time log' 22a2. In FIG. 6, the 'one or more depth data displays' 22b includes a 'depth log' 22b1 which displays the depth of the Bottom Hole Assembly (BHA) in the borehole, and, in particular, the depth of a 'drill bit' 22c2 associated with the BHA in the borehole. In FIG. 6, the 'BHA Schematic vs Hole Depth' display 22c includes the Bottom Hole Assembly (BHA) 22c1 and the 'drill bit' 22c2 associated with the BHA 22c1. Note that the 'drill bit' 22c2 is positioned adjacent to the 'depth log' 22b1. The 'depth log' 22b1 can scroll upwardly and downwardly adjacent to the 'drill bit' 22c2. As a result, the depth of the 'drill bit' 22c2 in the borehole can easily be determined by noting the location or position of the 'drill bit' 22c2 adjacent to the 'depth log' 22b1 on the depth data display 22b and 22c shown in FIG. 6. For example, in FIG. 6, the 'drill bit' 22c2 is positioned adjacent to depth '26955' on the 'depth log' 22b1 in FIG. 6. In addition, in FIG. 6, other displays are illustrated, such as the pie chart 22d, the crossplot 22e, and the bar chart 22f.

In FIG. 11, an enlarged view of the 'time line' 22a1 and the 'time log' 22a2 of FIG. 6 is illustrated. In FIG. 11, the user can adjust or move the 'time log' 22a2 relative to the 'time line' 22a1. As a result, the 'current time in the data' can easily be determined by adjusting or moving the 'time log' 22a2 relative to the 'time line' 22a1 until the 'time line' 22a1 is positioned directly over the 'current time in the data' on the 'time log' 22a2.

In FIG. 12, an enlarged view of the BHA 22c1 and the 'drill bit' 22c2 and the 'depth log' 22b1 of FIG. 6 is illustrated. In FIG. 12, note that the BHA 22c1 is positioned adjacent to the 'depth log' 22b1 and, as a result, as the 'depth log' 22b1 moves upwardly and downwardly in FIG. 12. The depth of the 'drill bit' 22c2 in the borehole can easily be determined by noting its position in the display of FIG. 12 relative to the 'depth log' 22b1. For example, the 'drill bit' 22c2 of FIG. 12 is located near the depth '26955' on the 'depth log' 22b1 and, as a result, the depth of the 'drill bit' 22c2 in the borehole is approximately '26955' feet.

In FIGS. 6, 11, and 12, the movement of the 'time log' 22a2 relative to the 'time line' 22a1 is synchronized with the movement of the 'depth log' 22b1 relative to the BHA 22c1 and its 'drill bit' 22c2. Recall that, during drilling, and when the 'time clock is ticking', the BHA 22c1 of FIG. 6 is often moved uphole and downhole a plurality of times. As a result, at time 't1', for example, the BHA 22c1 can be downhole, and at time 't2', the BHA 22c1 can be uphole. On the other hand, during drilling, and when the 'time clock is ticking', at time 't1', the BHA 22c1 can be uphole, and at time 't2', the BHA 22c1 can be downhole. It would be desirable to know the depth of the BHA 22c1 in the borehole at all previous and current points in time. Since the movement of the 'time log' 22a2 relative to the 'time line' 22a1 is synchronized with the movement of the 'depth log' 22b1 relative to the BHA 22c1 and its 'drill bit' 22c2 (hereinafter called, the 'synchronization feature'), one can easily determine the depth of the BHA 22c1 in the borehole (and the depth of the drill bit 22c2 of the BHA 22c1 in the borehole) at all previous and current points in time. This 'synchronization feature' can be more easily understood with reference to the functional 'operation' set forth below in the following paragraphs.

In FIG. 9, the 'one or more time or depth data displays' 22 includes a 'play' button 30 adapted for practicing a 'play' feature, a 'pause' button 32 adapted for practicing a 'pause' feature, a 'stop' button 34 adapted for practicing a 'stop' feature, a 'fast reverse' button 36 adapted for practicing a 'fast reverse' feature, and a 'fast forward' button 38 adapted for practicing a 'fast forward' feature. Recalling from FIG. 1 that the 'input data' includes 'historical data' 18 as well as a 'real time data stream' 16, when viewing the 'historical data' 18 on the 'one or more time or depth data displays' 22, it would be desirable to have the capability to fast forward or fast reverse through the historical data 18 when displaying the 'historical data' 18 on the 'one or more time or depth data displays' 22 including: (1) the 'depth log' 22b in conjunction with the 'BHA Schematic' 22c, together in association with (2) the 'time log' 22a2 in conjunction with the 'time line' 22a1. In addition, it would be desirable to be able to 'play' through the 'historical data' 18 as well as 'pause' or 'stop' the playing of the 'historical data' 18. In FIG. 9, the user can 'play' through the 'historical data' 18 being displayed on the 'one or more time or depth data displays' 22 of FIG. 6 by pressing or clicking on the 'play' button 30 in FIG. 9. In addition, the user can 'pause' the viewing of the 'historical data' 18 being displayed on the 'one or more time or depth data displays' 22 of FIG. 6 by clicking on the 'pause' button 32. The user can also: (1) 'stop' the viewing of the 'historical data' 18 by clicking on the 'stop' button 34, or (2) 'fast reverse' the viewing of the 'historical data' 18 by clicking on the 'fast reverse' button 36, or (3) 'fast forward' the viewing of the 'historical data' 18 by clicking on the 'fast forward' button 38. In addition, in FIG. 9, a speed controller feature 40 allows the user to choose the playback speed. By using the speed controller feature 40 in FIG. 9, the user to play data at a multitude of speeds, such as 'two-times the normal speed', or 'three-times the normal speed', or 'four-times the normal speed'.

In operation, referring to FIGS. 6, 11, and 12, the above referenced 'synchronization feature' functions in the following manner. In FIG. 11, assume that a user adjusts the location of the 'time log' 22a2 relative to the 'time line' 22a1 until the 'time line' 22a1 is positioned directly over a 'desired current time in the data' on the 'time log' 22a2. During the aforementioned adjustment (by the user) of the location of the 'time log' 22a2 relative to the 'timeline' 22a1, in FIG. 12, the 'depth log' 22b1 is also moving, in synchronism, relative to the 'drill bit' 22c2 of the BHA 22c1. Therefore, when the 'time line' 22a1' is positioned directly over the 'desired current time in the data' (which is somewhere between 08:00 and 08:30 on the 'time log' 22a2 of FIG. 11) on the 'time log' 22a2 of FIG. 11, the 'depth log' 22b1 of FIG. 12 has already moved relative to the 'drill bit' 22c2 (and in synchronization with the movement of the 'time log' 22a2 relative to the 'time line' 22a1 of FIG. 11) until the 'drill bit' 22c2 is positioned adjacent the depth '26955' on the 'depth log' 22b1. Thus, at the 'desired current time in the data' of FIG. 11, the 'drill bit' 22c2 of FIG. 12 is located at depth '26955' feet in the borehole. In addition, when the 'time log' 22a2 of FIGS. 6 and 11 is moved or adjusted, by the user, relative to the 'time line' 22a1 until a 'desired current time in the data' is located (at which point, the 'time line' 22a1 is positioned directly over the 'desired current time in the data' on the 'time log' 22a2 of FIGS. 6 and 11), the other displays 22d, 22e, and 22f shown in FIG. 6 (i.e, the pie chart 22d, the crossplot 22e, and the bar chart 22f) will also be adjusted, in synchronization, with the movement or adjustment of the 'time log' 22a2 relative to the 'time line' 22a1. As a result, in FIG. 6, the 'one more more depth data displays' 22b and the 'BHA Schematic vs Hole Depth' display 22c and the 'other displays' 22d, 22e, and 22f will be adjusted, in synchronization, with the adjustment of the 'time log' 22a2 relative to the 'time line' 22a1 associated with the 'one or more time data displays' 22a of FIGS. 6 and 11 until a 'particular point in time' or a 'desired current time in the data' is identified by the 'time line' 22a2 when the 'time line' 22a2 is positioned over the 'particular point in time' or the 'desired current time in the data' on the 'time log' 22a2 of FIGS. 6 and 11.

A functional description of the operation of the 'Time Synchronization and Display software' 14 of FIG. 2 will be set forth in the following paragraphs with reference to FIGS. 1 through 12 of the drawings.

In FIGS. 1 and 2, assume that the 'Time Synchronization and Display software' 14 of FIG. 1 has been loaded into the computer system 10 and that the 'real time data stream' 16 and/or the 'historical data' 18 and/or the 'engineering modeled data' 19 is provided to the computer system 10 as 'input data'. In FIG. 2, the processor 10a can now execute the 'Time Synchronization and Display software' 14 which is stored in the memory or program storage device 10b while using the 'input data' which comprises the 'real time data stream' 16 and/or the 'historical data' 18 and/or the 'engineering modeled data' 19. In response to the execution of the 'Time Synchronization and Display software' 14 by the processor 10a of the computer system 10 of FIG. 2, the 'data output' 22 of FIG. 2 will be generated by the 'recorder or display device' 10c, the 'data output' 22 being 'one or more time or depth data displays' 22. The 'one or more time or depth data displays' 22 can be either displayed on the 'Display' of the computer system 10 of FIG. 1, or the 'one or more time or depth data displays' 22 can be recorded by the 'recorder or display device' 10c. Since the 'input data' comprises a 'real time data stream' 16 and/or 'historical data' 18 and/or 'engineering modeled data' 19, the 'one or more time or depth data displays' 22 will display either: (1) 'real time data' which corresponds to the 'real time data stream' 16, or (2) 'historical data' and the 'engineering modeled data' which corresponds to the 'historical data' 18. The 'real time data' would comprise data that is currently being generated, in 'real time', by a measuring apparatus, where the measuring apparatus is generating the 'real time data' at the present time and not in some past or previous point in time (such as by a measuring apparatus disposed downhole in a borehole that is currently measuring borehole data or drilling data in 'real time' at the present time). The 'historical data' would comprise data that was generated at some previous or past point in time by a measuring apparatus (such as by the measuring apparatus disposed downhole that already previously measured borehole data or drilling data at some past or previous point in time). In FIG. 3, the 'Data Processor, Loader, Correlation, Synchronization Control' 24 (or 'Data Processor' 24) portion of the 'Time Synchronization and Display software' 14 of FIG. 2 will receive the 'real time data stream' 16 and the 'historical data' 18 and the 'engineering modeled data' 19 and, responsive thereto, the 'Data Processor' 24 will generate the 'one or more time or depth data displays' 22. In FIG. 4, recalling that the 'Data Processor, Loader, Correlation, Synchronization Control' 24 of FIG. 3 includes a Time Data Processor 24a and a Data Loader, Correlation, Synchronization Control 24e, the 'Time Data Processor' 24a portion of the 'Data Processor' 24 will receive the 'real time data stream' 16 and the 'historical data' 18 and the 'engineering modeled data' 19 and, responsive thereto, will generate the 'time data' 24b, the 'depth data' 24c, and the BHA data 24d. The BHA data 24d goes directly to the 'one or more time or depth data displays' 22. However, in FIG. 4, the 'time data' 24b and the 'depth data' 24c is provided as input data to the 'Data Loader, Correlation, Synchronization Control' 24e. The 'Data Loader, Correlation, Synchronization control' 24e will receive the 'time data' 24b and the 'depth data' 24c from the 'Time Data Processor' 24a, and, responsive thereto, the 'Data Loader, Correlation, Synchronization control' 24e will then load a 'portion of a particular depth data range' of the 'depth data' 22b1 associated with a single 'bit depth' into each individual graphical object, where the aforementioned 'portion of a particular depth data range' corresponds to a 'bit depth' and the 'bit depth' corresponds to a 'selected time' on a 'time log' 22a2 relative to a 'time line' 22a1, the 'selected time' being selected by a user. The 'portion of a particular depth data range' will be a range of depth data starting with 'zero depth' and ending with the 'bit depth'. In FIG. 5, recalling that the 'Data Loader, Correlation, Synchronization control' 24e of FIG. 4 includes a Time Range Focus Controller 24e1, the Time Data Loader 24e2, the Time Line Synchronization Control 24e3, and the 'Time→Depth Correlation Control' 24e6, the 'Time Range Focus Controller' 24e1 receives the time data 24b and, responsive thereto, sends 'time range data' to the 'Time Data Loader' 24e2 which will then send the 'time range data' to the 'one or more time data displays' 22a. However, the 'Time line Synchronization Control' 24e3 will receive the 'time range data' from the 'Time Range Focus Controller' 24e1 and, responsive thereto, the 'Time Line Synchronization Control' 24e3 will determine a 'current time in the data', where the 'current time in the data' will be a specific time which lies within the 'time range data'. The 'Time Line Synchronization Control' 24e3 will then send the 'current time in the data' to the 'one or more time data displays' 22a of FIG. 5. At this point, the 'one or more time data displays' 22a will be receiving: (1) the 'time range data' (comprised of a range of times from the 'start time' to the 'end time') from the 'Time Data Loader' 24e2, and (2) the 'current time in the data' from the 'Time Line Synchronization Control' 24e3. In the meantime, the 'Time Line Synchronization Control' 24e3 will be sending the 'current time in the data' along a line 24e5 to the 'Time→Depth Correlation Control' 24e6. The 'Time→Depth Correlation Control' 24e6 will: (1) receive the 'current time in the data' from line 24e5; (2) locate, from among the 'plurality of time data values' of the 'depth data' 24c, a 'particular time data value' which corresponds directly to the received 'current time in the data'; (3) generate a 'particular depth data value', from among the 'plurality of depth data values' of the 'depth data' 24c, which corresponds directly to the 'particular time data value'; (4) determine a 'range of depth data from zero depth to the particular depth data value' which corresponds directly to the 'particular depth data value'; and (5) send the 'range of depth data from zero depth to the particular depth data value' to the 'one or more depth data displays' 22b and to the 'BHA Schematic vs. Hole Depth' display 22c. At this point, the 'one or more time data displays' 22a will be receiving the 'time range data' (comprised of a range of times from the 'start time' to the 'end time') from the 'Time Data Loader' 24e2, and the 'current time in the data' from the 'Time Line Synchronization Control' 24e3; the 'one or more depth data displays' 22b will be receiving the 'range of depth data from zero depth to the particular depth data value' from the 'Time→Depth Correlation Control' 24e6; and the 'BHA Schematic vs. Hole Depth' display 22c will be receiving both: the 'range of depth data from zero depth to the particular depth data value' from the 'Time→Depth Correlation Control' 24e6, and the BHA data 24d.

A functional description of the operation of the user's interface with the 'one or more time or depth data displays' 22 of FIG. 6 will be set forth below with reference to FIGS. 6 through 12 of the drawings.

In FIG. 11, assume that a user adjusts the location of the 'time log' 22a2 relative to the 'time line' 22a1 until the 'time line' 22a1 is positioned directly over a 'desired current time in the data' on the 'time log' 22a2. During the aforementioned adjustment (by the user) of the location of the 'time log' 22a2 relative to the 'timeline' 22a1, in FIG. 12, the 'depth log' 22b1 is also moving, in synchronism, relative to the 'drill bit' 22c2 of the BHA 22c1. Therefore, when the 'time line' 22a1' is positioned directly over the 'desired current time in the data' (which is somewhere between 08:00 and 08:30 on the 'time log' 22a2 of FIG. 11) on the 'time log' 22a2 of FIG. 11, the 'depth log' 22b1 of FIG. 12 has already moved relative to the 'drill bit' 22c2 (and in synchronization with the movement of the 'time log' 22a2 relative to the 'time line' 22a1 of FIG. 11) until the 'drill bit' 22c2 is positioned adjacent the depth '26955' on the 'depth log' 22b1. Thus, at the 'desired current time in the data' of FIG. 11, the 'drill bit' 22c2 of FIG. 12 is located at depth '26955' feet in the borehole. In addition, when the 'time log' 22a2 of FIGS. 11 and 12 is moved or adjusted, by the user, relative to the 'time line' 22a1 until a 'desired current time in the data' is located (at which point, the 'time line' 22a1 is positioned directly over the 'desired current time in the data' on the 'time log' 22a2 of FIGS. 11 and 12), the other displays 22d, 22e, and 22f shown in FIG. 6 (i.e, the pie chart 22d, the crossplot 22e, and the bar chart 22f) will also be adjusted, in synchronization, with the movement or adjustment of the 'time log' 22a2 relative to the 'time line' 22a1. As a result, in FIG. 6, the 'one more more depth data displays' 22b and the 'BHA Schematic vs Hole Depth' display 22c and the 'other displays' 22d, 22e, and 22f will be adjusted, in synchronization, with the adjustment of the 'time log' 22a2 relative to the 'time line' 22a1 associated with the 'one or more time data displays' 22a of FIGS. 6 and 11 until a 'particular point in time' or a 'desired current time in the data' is identified by the 'time line' 22a2, the 'desired current time in the data' being identified when the 'time line' 22a2 is positioned over the 'particular point in time' or the 'desired current time in the data' on the 'time log' 22a2 of FIGS. 6 and 11. In addition, in FIG. 9, the user can: 'play' the viewing of the 'historical data' 18 on the 'one or more time or depth data displays' 22 by clicking on the 'play' button 30, or (2) 'pause' the viewing of the 'historical data' 18 by clicking on the 'pause' button 32, or (3) 'stop' the viewing of the 'historical data' 18 by clicking on the 'stop' button 34, or (4) 'fast reverse' the viewing of the 'historical data' 18 by clicking on the 'fast reverse' feature 36, or (5) 'fast forward' the viewing of the 'historical data' 18 by clicking on the 'fast forward' button 38, or (6) use the 'speed controller feature' 40 to vary the playback speed, such as to play back at 'two-times the normal speed' or 'three-times the normal speed', etc.

The invention disclosed in this specification is applicable to any process where the position of an 'object of interest' varies along a fixed path in space and time. For example, it could equally be applicable to a train on a railway line. In that case, the 'object of interest' (e.g., the BHA 22c1 of FIG. 12) goes back and forth along the same path (e.g., a wellbore) a multiple number of times. For example, in FIGS. 6, 11, and 12, the BHA 22c1 goes back and forth along the same wellbore path a multiple number of times.

In FIG. 6, note that the BHA 22c1 and the depth image 22b1 can be rescaled and scrolled such that the depth log 22b1 can be viewed in detail with respect to 'other points of interest' on the BHA 22c1, other than the drill bit 22c2, such as with respect to the stabilizers. In addition, in FIG. 6, the time/depth correlation is dependent on the fact that the position of 'one fixed point on the object of interest' is known in the time domain. In FIG. 6, the 'one fixed point on the object of interest' is the drill bit 22c2 on a BHA 22c1. However, the 'one fixed point on the object of interest' could include 'other fixed points' on 'an object of interest'; for example, the 'other fixed point' could be a stabilizer; and, in that case, the 'stabilizer depth' would be monitored instead of the 'drill bit depth'. In addition, in FIG. 6, in addition to 'historical data' 18, we could also be comparing 'depth logs' to 'planned depth logs'.

The above description of the Time Synchronization and Display software being thus described, it will be obvious that the same may be varied in many ways. Such variations are not to be regarded as a departure from the spirit and scope of the claimed method or apparatus or program storage device, and all such modifications as would be obvious to one skilled in the art are intended to be included within the scope of the following claims.

We claim:

1. A method, practiced in a computer system, of determining a depth of an object of interest in a borehole at a particular time, the computer system including:
   a processor that is responsive to input data;
   a recorder or display device; and
   a memory storing executable instructions, the method comprising:
   executing, by the processor, the instructions stored in the memory of the computer system in response to said input data;
   recording or displaying on the recorder or display device an output display including a time log having a plurality of times and a time line; and a depth log having a plurality of depths and the object of interest;
   moving said time log relative to said time line, said time line identifying said particular time among the plurality of times on the time log;
   moving said depth log relative to said object of interest in synchronism with the movement of the time log relative to the time line; and
   determining one of the plurality of depths on the depth log, which is located adjacent to the object of interest when the time line identifies said particular time on the time log, and thereby determining said one of the plurality of depths on the depth log representing said depth of the object of interest in the borehole at said particular time.

2. The method of claim 1, further comprising the output display of said recorder or display device displaying another display of at least one of a cross plot, a pie chart or a bar chart having at least one of sensor position, lithology, resitivity and vibration values, and wherein the values in said another display are updated in synchronism with the movement of the time log relative to the time line.

3. The method of claim 2, wherein the time log is adapted to be fast forwarded or fast reversed, and wherein the movement of the time log relative to the time line is fast forwarded in synchronism with the movement of the depth log relative to the object of interest.

4. The method of claim 3, wherein a speed of the fast forwarding or the fast reversing of the movement of the time log relative to the time line is controlled in synchronism with the movement of the depth log relative to the object of interest.

5. A program storage device readable by a processor tangibly embodying a set of executable instructions which when executed by the processor of a computer system, perform method steps for determining a depth of an object of interest in a borehole at a particular time, the computer system including the processor and a recorder or display device, said method steps comprising:
   receiving by the processor input data from user and in response to the input data executing the stored instructions;
   recording or displaying on the recorder or display device an output display including a time log having a plurality of times and a time line; and a depth log having a plurality of depths and the object of interest;
   moving said time log relative to said time line, said time line identifying said particular time among the plurality of times on the time log;
   moving said depth log relative to said object of interest in synchronism with the movement of the time log relative to the time line; and
   determining one of the plurality of depths on the depth log, which is located adjacent to the object of interest when the time line identifies said particular time on the time log, and thereby determining said one of the plurality of depths on the depth log representing said depth of the object of interest in the borehole at said particular time.

6. The program storage device of claim 5, wherein said method steps further comprise:
   the output display of said recorder or display device displaying another display of at least one of a cross plot, a pie chart or a bar chart having at least one of sensor position, lithology, resitivity and vibration values, and wherein the values in said another display are updated in synchronism with the movement of the time log relative to the time line.

7. The program storage device of claim 6, wherein the time log is adapted to be fast forwarded or fast reversed, and wherein the movement of the time log relative to the time line is fast forwarded in synchronism with the movement of the depth log relative to the object of interest.

8. The program storage device of claim 7, wherein a speed of the fast forwarding or the fast reversing of the movement of the time log relative to the time line is controlled in synchronism with the movement of the depth log relative to the object of interest.

9. A computer system adapted for determining a depth of an object of interest in a borehole at a particular time, comprising:
   a memory storing a software;
   a processor executing the software stored in the memory;
   a user interface for receiving by the processor input data from user; and
   a recorder or display device for recording or displaying an output display;
   wherein when the software is executed by the processor, the software performs:
   recording or displaying on the recorder or display device an output display including a time log having a plurality of times and a time line; and a depth log having a plurality of depths and the object of interest;
   moving said time log relative to said time line, said time line identifying said particular time among the plurality of times on the time log;
   moving said depth log relative to said object of interest in synchronism with the movement of the time log relative to the time line; and
   determining one of the plurality of depths on the depth log, which is located adjacent to the object of interest when the time line identifies said particular time on the time log, and thereby determining said one of the plurality of depths on the depth log representing said depth of the object of interest in the borehole at said particular time.

10. The computer system of claim 9, wherein when the software is executed by the processor, the software further performs:
    displaying another display of at least one of a cross plot, a pie chart or a bar chart having at least one of sensor position, lithology, resitivity and vibration values, and wherein the values in said another display are updated in synchronism with the movement of the time log relative to the time line.

11. The computer system of claim 10, wherein the time log is adapted to be fast forwarded or fast reversed, and wherein the movement of the time log relative to the time line is fast forwarded in synchronism with the movement of the depth log relative to the object of interest.

12. The computer system of claim 11, wherein a speed of the fast forwarding or the fast reversing of the movement of the time log relative to the time line is controlled in synchronism with the movement of the depth log relative to the object of interest.

13. A computer readable memory medium storing a program of instructions, which when executed by a computer perform a method for determining a depth of an object of interest in a borehole at a particular time, the computer comprising:

a memory storing a software;

a processor executing the software stored in the memory;

a user interface for receiving by the processor input data from user; and a recorder or display device for recording or displaying an output display;

the medium comprising instructions for:

executing, by the computer, the instructions stored in the medium in response to input data;

recording or displaying on the recorder or display device an output display including a time log having a plurality of times and a time line; and a depth log having a plurality of depths and the object of interest;

moving said time log relative to said time line, said time line identifying said particular time among the plurality of times on the time log;

moving said depth log relative to said object of interest in synchronism with the movement of the time log relative to the time line; and determining one of the plurality of depths on the depth log, which is located adjacent to the object of interest when the time line identifies said particular time on the time log, and thereby determining said one of the plurality of depths on the depth log representing said depth of the object of interest in the borehole at said particular time.

14. The computer readable memory medium of claim 13, wherein the method further comprises:

the output display of said recorder or display device displaying another display of at least one of a cross plot, a pie chart or a bar chart having at least one of sensor position, lithology, resitivity and vibration values, and wherein the values in said another display are updated in synchronism with the movement of the time log relative to the time line.

15. The computer readable memory medium of claim 14, wherein the time log is adapted to be fast forwarded or fast reversed, and wherein the movement of the time log relative to the time line is fast forwarded in synchronism with the movement of the depth log relative to the object of interest.

16. The computer readable memory medium of claim 15, wherein a speed of the fast forwarding or the fast reversing of the movement of the time log relative to the time line is controlled in synchronism with the movement of the depth log relative to the object of interest.

* * * * *